Feb. 21, 1939.  W. LAMPL  2,148,077
COMPACT
Filed Feb. 14, 1938
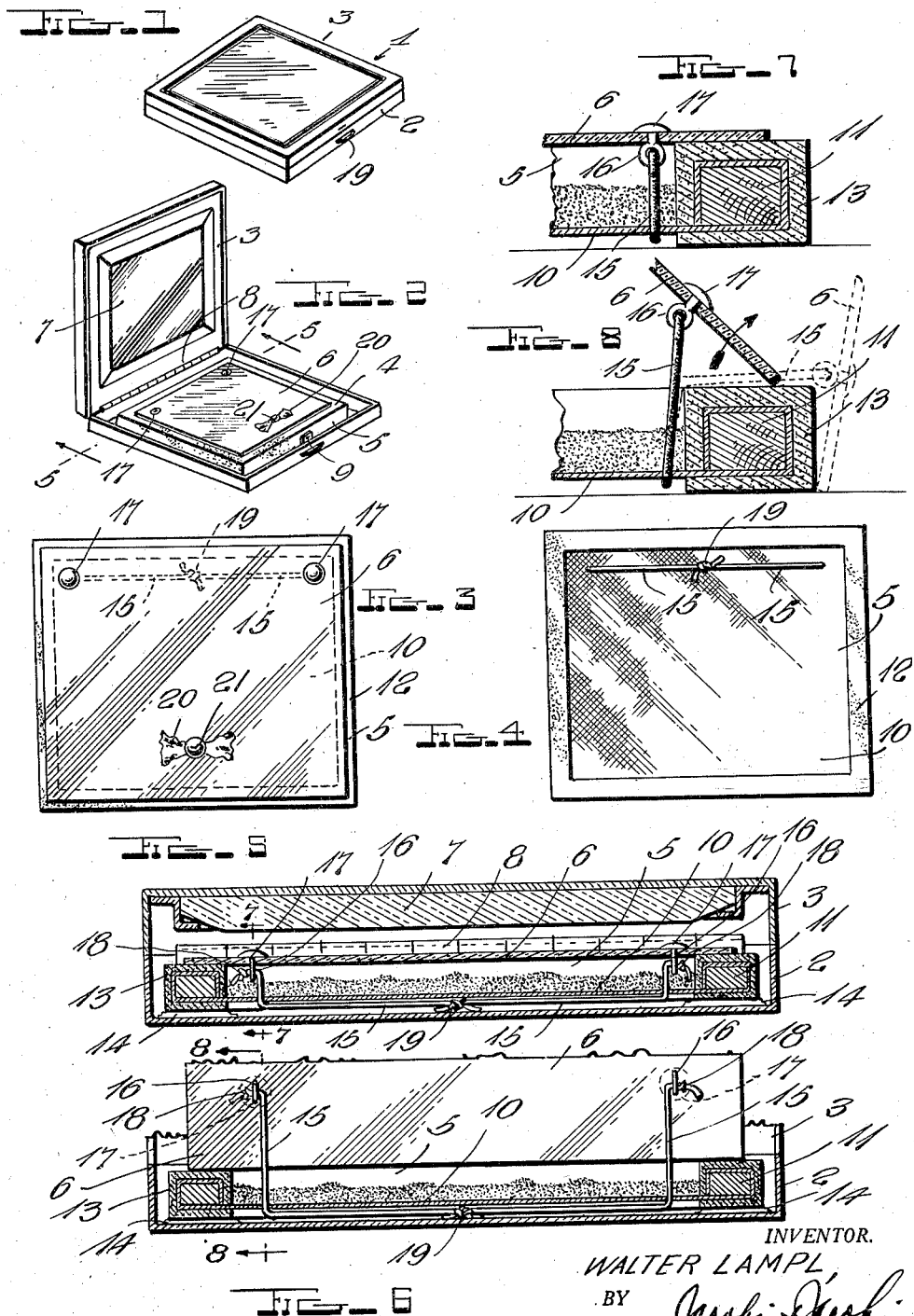
INVENTOR.
WALTER LAMPL,
BY Jacobi & Jacobi
ATTORNEYS.

Patented Feb. 21, 1939

2,148,077

UNITED STATES PATENT OFFICE 2,148,077

COMPACT

Walter Lampl, New York, N. Y.

Application February 14, 1938, Serial No. 190,493

6 Claims. (Cl. 132—83)

This invention relates to a compact or powder container of the type used by women for holding face powder which is to be carried in a purse or hand bag. The improved compact consists of a main casing in which is disposed an inner container or powder holder constituting a refill, and it is one object of the invention to provide a refill which is of such construction that it may be easily inserted within the main casing and firmly but removably secured. It will thus be seen that when the powder container or refill becomes soiled it may be easily removed and replaced with a new one and it will not be necessary to discard the main container or casing which may be of expensive material.

Another object of the invention is to provide an inner powder container which is of such formation that it includes in its construction a powder-holding body and a cover, the cover being of transparent material so that powder therein can be seen when the cover is closed and improved means being provided for mounting the cover so that it may be opened and closed.

Another object of the invention is to provide a compact wherein the cover for the inner container consists of a sheet of transparent sheet material mounted for movement to a closed or opened position by means of an elastic serving not only as means for movably mounting the cover but also constituting means for urging the cover towards a closed position and holding the cover tightly closed so that powder will not sift out of the powder container when it is not in use.

Another object of the invention is to provide a compact which is of simple construction and capable of being cheaply manufactured and sold at a relatively low price.

Still another object of the invention resides in providing a device which is simple and durable in construction, inexpensive to manufacture and one which will be very efficient in operation and application to use.

With these and numerous other objects in view, my invention consists in the novel features of construction, combination and arrangement of parts as will be hereinafter referred to and more particularly pointed out in the specification and claims.

The invention is illustrated in the accompanying drawing wherein:

Figure 1 is a perspective view of the improved compact when closed;

Figure 2 is a perspective view showing the compact opened;

Figure 3 is a top plan view of the powder container;

Figure 4 is a bottom plan view of the powder container;

Figure 5 is a sectional view taken transversely through the compact along the line 5—5 of Figure 2 with the cover of the main casing closed;

Figure 6 is a view similar to Figure 5 showing the cover of the main casing and the cover of the powder container in an opened position;

Figure 7 is a section upon an enlarged scale taken along the line 7—7 of Figure 5; and Figure 8 is a section taken along the line 8—8 of Figure 6.

This compact consists briefly of a main casing 1 having a body 2 and cover 3 and powder container 4 which fits within the main casing and has a powder receiving body 5 and a cover 6. The inner container is removably secured in the main container and when it becomes soiled it can be removed and a new one set in place. When powder is to be used the cover of the main casing is raised as shown in Figure 2, and the cover or lid of the inner container then raised so that access may be had to the powder therein. A mirror 7 is carried by the cover 3 of the main casing against the inner surface thereof for use when applying the powder. The main casing is of a conventional construction, its cover 3 being hinged as shown at 8 and a latch 9 being provided in order that the cover may be secured in a closed position.

The inner container or powder holder consists of a body formed of a sheet of fabric 10 such as silk or the like and marginal portions of this sheet are glued or otherwise secured about a frame 11 to form marginal walls 12 which are bound with a binding 13 consisting of any fabric having a soft surface formed with a nap. The frame 11 may be formed of wood or other material found suitable. Pads 14 are provided at corners of the body 5 and when these are glued to the bottom of the casing body 2 the inner container will be firmly held in place therein and maintained in slight spaced relation to the bottom of the main casing throughout substantially its entire area as shown in Figures 5 and 6 so that excessive wear upon the fabric from which the powder container is formed will be eliminated when removing powder with a powder puff.

The cover or lid 6 of the powder container consists of a sheet of transparent material such as Celluloid and in order to mount this lid there has been provided elastics 15 which are passed through eyes 16 at inner ends of headed pins 17 which pass through corner portions of the lid as shown in Figures 5, 7 and 8. Knots 18 are formed at outer ends of the elastics after they have been passed through the eyes 16 and the elastics are threaded through the fabric body 5 of the container and tied together in a knot as shown at 19 in Figures 5 and 6. As the elastics are tied together they will be stretched sufficiently to place them under tension and cause them to exert pull upon the lid which will urge the lid towards a closed position and hold it in such close fitting engagement with the flat upper surfaces of the marginal walls 12 that powder will be prevented from sifting out of the powder container when the lid is closed. A ribbon 20 of bow form is secured through the lid midway its width at its front by means of a staple-like fastener 21 and constitutes a finger engaging member by means of which the lid may be easily swung to a raised position when powder is to be used.

When this improved compact is in use powder is placed within the powder container and is retained therein by the lid or cover 6 which is held closed by the elastics 15. The lid is held tightly closed by the elastics and when the cover 3 of the main casing is closed the compact can be placed in a pocketbook or hand bag without danger of the powder sifting out and spoiling other articles. When powder is to be used the cover 3 is raised and the lid 6 then swung to a raised position in which its rear edge portion moves back of the rear wall of the powder container body. Powder may then be removed with a powder puff and applied, the lid being maintained in its raised position until no more powder is needed or being immediately released and allowed to swing to a closed position. When the lid is released contraction of the elastics will exert pull thereon and swing it down to the closed position where it will be held with its marginal portions in close contacting engagement with upper faces of the walls 12. When it is necessary to replace the powder container it is merely necessary to tear it loose from the bottom of the body 2 of the main casing and glue another in its place. The powder container may, therefore, be renewed when necessary and the main casing need not be discarded.

From the foregoing description of the construction of my improved device, the operation thereof and the method of applying the same to use, will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention, what is claimed is:

1. In a compact, a main receptacle having a body and a cover movable from a closed position to an opened position, and an auxiliary receptacle within said main receptacle and consisting of a body mounted within the body of the main receptacle, and a cover for the auxiliary receptacle formed of transparent material and connected with the auxiliary receptacle for movement into and out of a closed position independent of the cover for the main receptacle.

2. In a compact, a main casing having a cover movable into and out of a closed position, and an auxiliary powder receptacle formed separate from the main casing and mounted within said casing and comprising a body open at its top, a lid for said body, and an elastic strand carried by the body and connected with the lid to mount said lid for movement from a closed position upon the body to a raised position back of the body.

3. In a compact, a casing having a cover movable from a closed position to an opened position, and a powder receptacle in said casing comprising a body open at its top, a lid for said body formed from a sheet of transparent material, the lid being free from direct connection with the body and having marginal portions in flat contacting engagement with walls of the body when in a closed position, and elastic means yieldably holding the lid closed and mounting the lid for shifting movement from a closed position to a raised position back of said body.

4. In a compact, a casing having a cover movable from a closed position to an opened position, and a powder receptacle in said casing comprising a body open at its top and having marginal walls spaced from walls of the casing, a lid for said body having marginal portions resting upon the upper faces of the walls of the body when in a closed position, and a flexible elastic strands constituting a yieldable connection between the body and the lid engaged with the lid adjacent the rear marginal portion thereof and mounting the lid for shifting movement from a closed position to a raised position in which its lower portion fits between rear walls of the casing and the body.

5. In a compact, a powder container comprising a tray-like body having a bottom and marginal walls, a lid for said body having marginal portions resting upon said walls when in a closed position, and a flexible elastic strand extending transversely of said body and carried by the bottom thereof with end portions extending upwardly therefrom and connected with the rear portion of said lid in spaced relation to each other transversely of the lid and tensioned to exert pull upon the lid and urge the lid towards a closed position while mounting the lid for bodily shifting movement from a closed position to a raised position in which it extends upwardly with its lower end portion back of the rear wall of the body and the said end portions of the strand extending across the upper face of the rear wall of the body.

6. In a compact, a powder container comprising a tray-like body having a bottom and marginal walls, a lid for said body having marginal portions resting upon said walls when in a closed position, eyes carried by said lid and projecting from the inner face thereof in spaced relation to each other transversely of the lid adjacent the rear wall of the body, and a linear elastic member extending transversely of said body under the bottom thereof with its end portions passed upwardly through openings in the bottom and secured through said eyes and tensioned to exert pull upon the lid and urge the lid towards a closed position while permitting shifting of the lid upwardly and across the rear wall of the body to an opened position.

WALTER LAMPL.